US007706443B2

(12) United States Patent
Chandramouly et al.

(10) Patent No.: US 7,706,443 B2
(45) Date of Patent: Apr. 27, 2010

(54) METHOD, ARTICLE OF MANUFACTURE, AND APPARATUS FOR HIGH QUALITY, FAST INTRA CODING USABLE FOR CREATING DIGITAL VIDEO CONTENT

(75) Inventors: Ashwin Amarapur Chandramouly, Davanagere (IN); Shailesh Ramamurthy, Karnataka (IN)

(73) Assignee: General Instrument Corporation, Horsham, PA (US)

( * ) Notice: Subject to any disclaimer, the term of this patent is extended or adjusted under 35 U.S.C. 154(b) by 1416 days.

(21) Appl. No.: 11/078,937

(22) Filed: Mar. 11, 2005

(65) Prior Publication Data
US 2006/0203916 A1 Sep. 14, 2006

(51) Int. Cl.
*H04N 7/12* (2006.01)
*H04N 11/02* (2006.01)
*H04N 11/04* (2006.01)

(52) U.S. Cl. .............................. 375/240.12; 375/240.24; 382/238; 348/409.1; 348/420.1

(58) Field of Classification Search ................................. 375/240.01–240.27
See application file for complete search history.

(56) References Cited

U.S. PATENT DOCUMENTS

2004/0114688 A1* 6/2004 Kang ..................... 375/240.12

2005/0276326 A1* 12/2005 Drezner ................. 375/240.12

OTHER PUBLICATIONS

Chun-Ling Yang; Lai-Man Po; Wing-Hong Lam, "A fast H.264 intra prediction algorithm using macroblock properties," Image Processing, 2004. ICIP '04. 2004 International Conference on , vol. 1, no., pp. 461-464 vol. 1, Oct. 24-27, 2004 URL: http://ieeexplore.ieee.org/stamp/stamp.jsp?arnumber=1418790&isnumber=30672.*
Fangwen Fu; Xinggang Lin; Lidong Xu, "Fast intra prediction algorithm in H.264-AVC," Signal Processing, 2004. Proceedings. ICSP '04. 2004 7th International Conference on , vol. 2, no., pp. 1191-1194 vol. 2, Aug. 31-Sep. 4, 2004 URL: http://ieeexplore.ieee.org/stamp/stamp.jsp?arnumber=1441537&isnumber=30994.*

(Continued)

*Primary Examiner*—David Czekaj
*Assistant Examiner*—Jeremaiah C Huber
(74) *Attorney, Agent, or Firm*—Larry T. Cullen

(57) ABSTRACT

A method for high quality, fast intra coding usable for creating digital video content. The video image is defined by data points representing original colors. Data points are selected based on a color characteristic, and are arranged into groups. At an initial stage (and at subsequent stages): selecting a subset of data points, using a number of algorithms to generate predicted values of the colors represented by the data points, calculating error values and evaluating mathematical functions to produce cost values, identifying a minimum cost value, establishing a threshold based on the minimum cost and a selection factor, comparing each cost value to the threshold value, and identifying a number of probable best algorithms. One of the probable best algorithms is usable for block size selection and to generate final predicted values of the original color represented by the data points.

37 Claims, 7 Drawing Sheets

OTHER PUBLICATIONS

Chang-sung Kim; Qing Li; C.-C Jay Kuo, "Fast Intra Prediction Model Selection for H.264 Codec", SPIE International Symposium ITCOM 2003 URL: http://citeseerx.ist.psu.edu/viewdoc/download-?doi=10.1.1.2.4112&rep=rep1&type=pdf.*

Cheng, C.-C. Chang, T.-S. "Fast Three Step Intra Prediciton Alagorithm for 4×4 Blocks in H.264" IEEE International Symposium on Circuits and Systems, s 2005, vol. 2, pp. 1509-1512.*

F. Pan; X. Line; S. Rahardja; K. P. Lim; Z. G. Li; D. Wu; S. Wu, "Fast intra mode decision algorithm for H. 264/AVC video coding", Proceedings of ICIP 200},781-784, 2004.*

Feng Pan et al., "Fast Mode Decision for Intra prediction," JVT-G013, Pattaya, Thailand, Mar. 7-14, 2003.

Yin Peng et al., "Fast Mode Decision and Motion Estimation for JVT/H.264," ICIP 2003.

Bojun Meng et al., "Efficient Intra-Prediction Mode Selection for 4×4 Blocks in H.264," ICME 2003, III-521-III-524.

"Draft ITU-T Recommendation and Final Draft International Standard of Joint Video Specification (ITU-T Rec. H.264, ISO/IEC 14496-10 AVC")", Pattaya, Thailand, Mar. 7-14, 2003.

* cited by examiner

FIG. 1 -PRIOR ART-

|   | A | B | C | D | E | F | G | H |
|---|---|---|---|---|---|---|---|---|
| Q |   |   |   |   |   |   |   |   |
| I | a ($P_{00}$) | b ($P_{01}$) | c ($P_{02}$) | d ($P_{03}$) |   |   |   |   |
| J | e ($P_{10}$) | f ($P_{11}$) | g ($P_{12}$) | h ($P_{13}$) |   |   |   |   |
| K | i ($P_{20}$) | j ($P_2$) | k ($P_{22}$) | l ($P_{23}$) |   |   |   |   |
| L | m ($P_{30}$) | n ($P_3$) | o ($P_{32}$) | p ($P_{33}$) |   |   |   |   |

~200

−PRIOR ART−

−PRIOR ART−

METHOD, ARTICLE OF MANUFACTURE, AND APPARATUS FOR HIGH QUALITY, FAST INTRA CODING USABLE FOR CREATING DIGITAL VIDEO CONTENT

BACKGROUND

Aspects of this invention relate generally to data processing, and more particularly to a method and apparatuses for high quality, fast intra coding usable for creating digital video content Video compression technology enables the creation, distribution, receipt, and/or display of digital video data, which includes any pre-recorded or live electronic signals representing video images, by sources such as consumer devices (for example, personal computers, hard-drive storage devices, digital televisions, digital video camera recorders, digital video disk recorders/players, digital set-top boxes, telecommunications devices, and video production devices, among other devices), television networks and stations, studios, Internet broadcasters, wireless operators, and cable/satellite operators, among others.

Various industry specifications, or standards, relating to video compression technology have been promulgated by groups desiring, among other things, to ensure interoperability between devices and systems that create, deliver, receive and/or display digital video data. The International Telecommunication Union—Telecommunications Standardization Sector's ("ITU-T") Video Coding Experts Group ("VCEG") and the International Organization for Standardization/International Electrotechnical Commission's ("ISO/IEC") Moving Picture Experts Group ("MPEG"), for example, are jointly developing a video compression standard referred to by the ITU-T as "H.264," and by the ISO/IEC as "MPEG-4 Advanced Video Coding," which is embodied in a document entitled "Draft ITU-T Recommendation and Final Draft International Standard of Joint Video Specification (ITU-T Rec. H.264, ISO/IEC 14496-10 AVC)", Pattaya, Thailand, 7-14 Mar., 2003 (hereinafter, the video compression standard will be referred to as the "H.264/AVC Standard"). The H.264/AVC Standard is hereby incorporated by reference in its entirety for all purposes, as if set forth in full herein.

The H.264/AVC Standard defines, among other things, a video coding layer ("VCL") to produce a digital representation of input video images. An encoder/decoder pair ("CODEC") implementing the VCL of the H.264/AVC Standard generally performs the well-known functions of prediction, transformation, quantization, and entropy coding, to produce/decode an encoded bit stream having a particular syntax. Each picture of an input video is partitioned into fixed-sized blocks of data called macroblocks that cover a rectangular picture area of 16×16 samples of the luminance ("luma") component of the picture color, and 8×8 samples of each of the two chrominance ("chroma") components of the picture color. All luma and chroma samples of a macroblock are either spatially or temporally predicted, the prediction residuals thereof are transformed using an integer transform, and the transform coefficients are quantized and transmitted using entropy-coding methods.

Macroblocks are organized into slices, which are subsets of a given picture that are independently decodable. Each macroblock may be coded using one of several coding types, depending on the slice type of the macroblock. One type of slice is an intra-("I") slice, which provides for the coding of macroblocks without referring to other pictures within the input video sequence (hereinafter referred to as "intra coding"). The H.264/AVC Standard specifies techniques for intra coding luma-component macroblocks as 16 4×4 blocks or as a single 16×16 block. Chroma-component macroblocks are intra coded in the same manner as 16×16 luma-component macroblocks. Each 4×4 block contains sixteen pixels.

The H.264/AVC Standard designates prediction modes, which are used to generate predictive pixel values. There are nine prediction modes for 4×4 luma-component blocks, four prediction modes for 16×16 luma- and chroma-component blocks. The reference software of H.264/AVC, popularly known as JM (Joint Model) software, uses a full search ("FS") algorithm for determining the prediction mode with which a given macroblock should be encoded—the FS algorithm calls for examining each of the pixels in a macroblock using each of the nine prediction modes to determine the prediction mode that yields predictive pixel values closest to original samples of the picture of the input video.

Although the H.264/AVC Standard has higher compression efficiency than previous video compression technologies such as MPEG-2, the computational complexity, or cost, for intra coding I-slice type macroblocks (and also for coding P-slice type macroblocks, motion estimation, and block selection algorithms) according to the FS algorithm is high, and therefore very processor-intensive, which may impact upon the design and/or cost of H.264/AVC Standard-compliant CODECS, or other hardware, software, or firmware.

Other proposed fast intra coding prediction mode selection techniques relevant to the H.264/AVC Standard include: (1) using an edge map histogram for macroblocks to reduce the number of prediction modes used for mode decisions (see Feng Pan et al., "Fast Mode Decision for Intra prediction," JVT-G013, Pattaya, Thailand, 7-14 Mar., 2003); (2) performing a combined motion estimation and prediction mode decision, based on comparisons of block energies with a threshold to eliminate certain prediction modes (see Yin Peng et al., "Fast Mode Decision and Motion Estimation for JVT/H.264," ICIP 2003); and (3) reducing the number of prediction modes used for mode decisions according to, among other things, a locally adaptive threshold factor based on a frequency term associated with local image information (see Bojun Meng et al., "Efficient Intra-Prediction Mode Selection for 4×4 Blocks in H.264," ICME 2003, III-521-III-524 ("Meng et al.")). Considerable computation is necessary to find edge map histograms and to determine block energies, however, and Meng et al. do not disclose how to compute the frequency term in the proposed adaptive threshold factor, which undoubtedly increases computational complexity.

There is therefore a need for a computationally efficient algorithm for use in determining optimal prediction modes for intra coding I-slice type macroblocks in the context of the H.264/AVC Standard and other data processing applications, which algorithm accurately preserves decoded video quality while also allowing a tunable tradeoff between computational complexity and decoded video quality.

SUMMARY

According to one aspect of the present invention, the foregoing needs are addressed by a method for creating digital content usable to reconstruct a video image. The video image is defined by a plurality of data points, such as pixels, and each data point represents an original color. The original color has a plurality of color characteristics, such as components like chrominance, luminance, and others. The method may be an intra-prediction video processing step set forth in "Draft ITU-T Recommendation and Final Draft International Standard of Joint Video Specification (ITU-T Rec. H.264, ISO/IEC 14496-10 AVC), JVT-G050," Pattaya, Thailand, 7-14

Mar., 2003 (the "H.264 Standard"), and includes: selecting a set of data points from the plurality of data points based on a color characteristic; arranging the set of data points into a plurality of groups of data points, such as 4×4 blocks, 8×8 blocks, or 16×16 blocks of pixels; selecting a first group of data points (represented, for example, by $p_{2*i,2*j}$, i=0,1, j=0,1) from the plurality of groups of data points.

At an initial stage, the following steps are performed: selecting an initial subset of data points from the selected first group of data points, using an initial number of algorithms, for each initial algorithm generating a predicted value of the color represented by each of the data points in the initial subset of data points, for each initial algorithm, calculating a corresponding initial error value, each calculated corresponding initial error value based on a difference (for example, the sum of absolute differences ("SAD") computation described in the H.264 Standard) between the original color and the predicted value of the original color represented by at least some of the data points in the initial subset of data points, for each initial algorithm, evaluating a mathematical function based on the calculated corresponding initial error value, each evaluation producing an initial cost value associated with a particular initial algorithm, identifying a minimum initial cost value (for example, $cost_{4*i}=SAD_i+P*\lambda(Q)+Cost_{4*(i-1)}$ for i=1, 2, 3, 4, where $cost_{4i}=0$ for i=0, P=0 for the minimum SAD, and P=1 otherwise), establishing an initial threshold value based on the minimum initial cost value and based on an initial selection factor (the initial selection factor may be between zero and one, and/or based on a desired signal-to-noise relationship between a reconstructed video image and the video image (for example, $T_i=Cost_{4*i}(minimum)+Range_i*S_i$ for i=1, 2, 3, $Range_i=i*Range_i$, and $Range_1=(Cost_4 (maximum)-Cost_4(minimum))$, and wherein Si comprises the selection factor, $0<S_3<S_2<S_1<1$)), comparing each initial cost value to the initial threshold value, and based on the step of comparing, identifying a number of probable best algorithms (for example, the identified number of probable best algorithms may have associated initial cost values less than the initial threshold value), from among the initial algorithms, the number of probable best algorithms fewer than the initial number of algorithms.

When the identified number of probable best algorithms is greater than a predetermined number, the following steps are performed at a subsequent stage: selecting a subsequent subset of data points from the selected first group of data points (the union of the initial subset of data points and the subsequent subset of data points may be zero), using each probable best algorithm of the number of probable best algorithms, generating a predicted value of the original color represented by each of the data points in the subsequent subset of data points, for each probable best algorithm, calculating a corresponding subsequent error value, each calculated corresponding subsequent error value based on a difference between the original color and the predicted value of the original color represented by at least some of the data points in the subsequent subset of data points, for each probable best algorithm, evaluating a mathematical function based on the calculated corresponding subsequent error value, each evaluation producing a subsequent cost value associated with a particular probable best algorithm, identifying a minimum subsequent cost value, establishing a subsequent threshold value based on the minimum subsequent cost value and based on a subsequent selection factor (the subsequent selection factor may be between zero and one and/or based on a desired signal-to-noise relationship between a reconstructed video image and the video image, and/or be less than the initial selection factor), identifying a subsequent number of probable best algorithms from among the probable best algorithms. One of the subsequent number of probable best algorithms is usable to generate a final predicted value of the original color represented by each of the data points in the selected first group of data points, the generated final predicted values comprising digital content usable to reconstruct the video image.

When the number of probable best algorithms is one, that probable best algorithm may be used to generate a final predicted value of the original color represented by each of the data points in the selected group of data points. When the subsequent number of probable best algorithms is greater than one, the steps after "at the subsequent stage" are repeated. When the steps after "at the subsequent stage" have been repeated, and when the identified subsequent minimum cost values are associated with the same probable best algorithms, that probable best algorithm may be used to generate the final predicted value of the original color represented by each of the data points in the selected first group of data points. Alternatively, when the identified subsequent minimum cost values are not associated with the same probable best algorithms, the steps after "at the subsequent stage" may be repeated again. In a further alternative, a previously determined prediction algorithm associated with second group of data points spatially adjacent to the selected first group of data points may be used to generate a final predicted value of the original color when the probable best algorithm associated with the minimum subsequent cost value is the same as the predetermined previously determined prediction algorithm.

The step of selecting a first group of data points from the plurality of groups of data points may have further steps associated therewith, such as computing a mode frequency metric based on the rate of change of a probable best algorithm associated with each 4×4 block of pixels within a macroblock, which represents an extent of non-uniformity of the color characteristic over the macroblock. The mode frequency value may be compared with a threshold value, which is based on a desired signal-to-noise relationship between a reconstructed video image and the video image, and further based on a quantization factor associated with the reconstructed video image. When the mode frequency value is greater than or equal to the threshold value, the step of arranging the set of data points into a plurality of groups of data points is accomplished by arranging the plurality of groups of data points into 4×4 blocks of pixels.

Generally, each initial algorithm is selected from one of nine luminance prediction modes set forth in the H.264 Standard, although when a rate distortion optimization scheme as set forth in the H.264 Standard is used, the initial number of algorithms may be fewer than nine algorithms. In that case, the foregoing method is performed using all nine algorithms, and the initial algorithms are selected from among the subsequent probable best algorithms.

In accordance with another aspect of the present invention, a computer-readable medium is encoded with a computer program which, when loaded into a processor, is operative to perform the foregoing method.

In accordance with a further aspect of the present invention, an apparatus for creating digital content usable to reconstruct a video image is provided. The video image is defined by a plurality of data points, each data point representing an original color, and the original color has a plurality of color characteristics. The apparatus includes a computer-readable storage medium, and a processor responsive to the computer-readable storage medium and to a computer program. The computer program, when loaded into the processor, is operative to perform the foregoing method.

In accordance with a still further aspect of the present invention, a method for creating digital content usable to reconstruct a video image is provided. The video image is defined by a plurality of data points, each data point representing an original color, the original color having a plurality of color characteristics. The method includes: selecting a set of data points from the plurality of data points based on a color characteristic; arranging the set of data points into a plurality of groups of data points; selecting a first group of data points from the plurality of groups of data points, the first group of data points having a number of blocks of data points associated therewith; for each of the number of blocks of data points associated with the first group of data points: using a number of algorithms, for each algorithm generating a predicted value of the color represented by each of the data points in the subset of data points, for each algorithm, evaluating a mathematical function based on a calculated corresponding error value, each evaluation producing a cost value associated with a particular algorithm, based on the cost values, identifying at least one probable best algorithm from among the algorithms. Then using one of the probable best algorithms associated with each of the number of blocks of data points, computing a mode frequency metric, the mode frequency metric based on the rate of change of the ones of the probable best algorithms associated with each of the number of blocks of data points, the mode frequency metric producing a mode frequency value representing an extent of non-uniformity of the color characteristic over the first group of data points. The mode frequency metric is used to determine a block size parameter for use in generation of a final predicted value of the original color represented by each of the data points in the selected first group of data points, and the generated final predicted values are digital content usable to reconstruct the video image.

DETAILED DESCRIPTION

Figure 1:
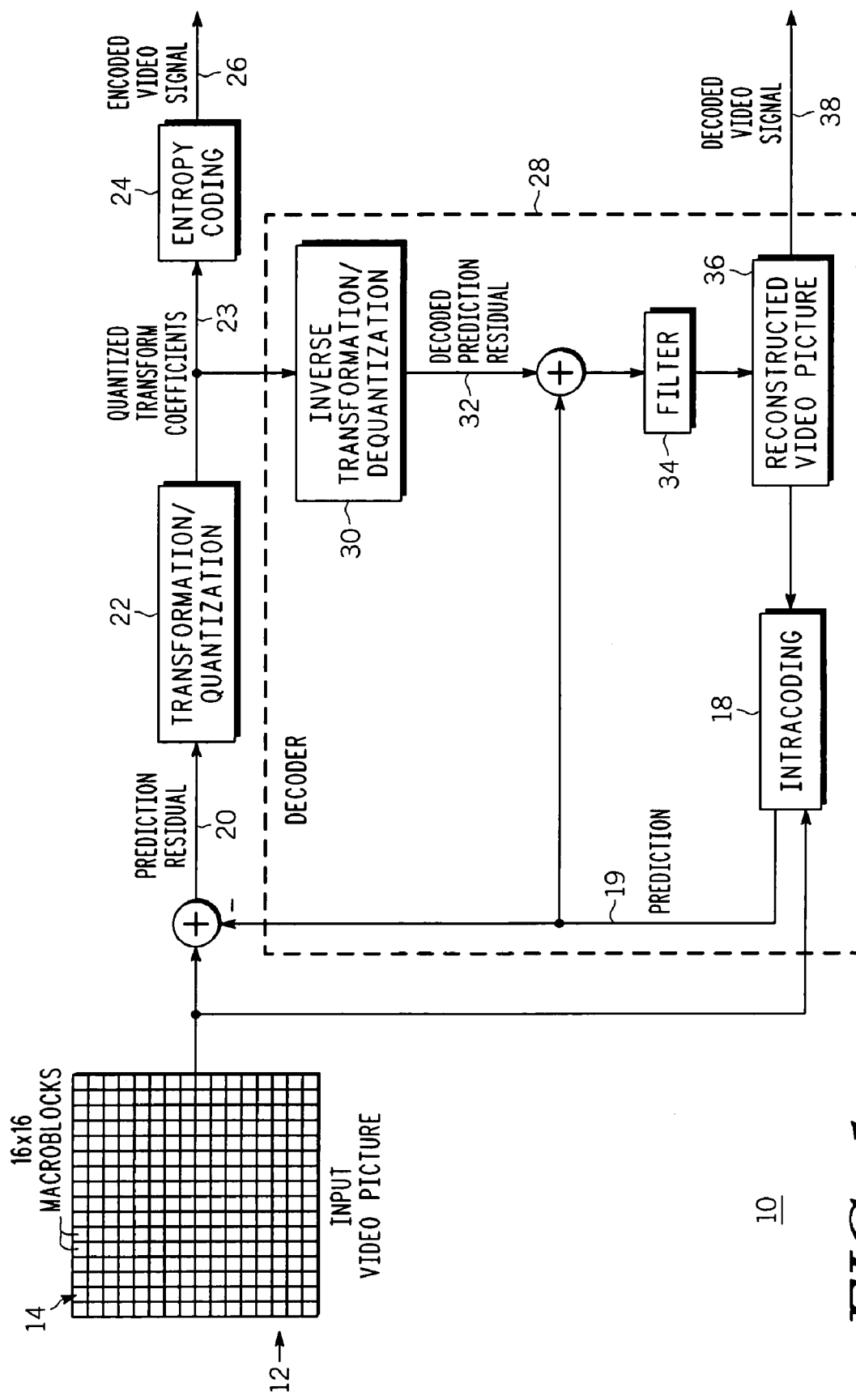
FIG. 1 is a partial functional block diagram of the video coding layer set forth in the video coding standard jointly developed by the International Telecommunication Union—Telecommunications Standardization Sector's ("ITU-T") Video Coding Experts Group ("VCEG") and the International Organization for Standardization/International Electrotechnical Commission's ("ISO/IEC") Moving Picture Experts Group ("MPEG"), embodied in a document entitled "Draft ITU-T Recommendation and Final Draft International Standard of Joint Video Specification (ITU-T Rec. H.264, ISO/IEC 14496-10 AVC)", Pattaya, Thailand, 7-14 Mar., 2003 (the "H.264/AVC Standard").

Turning now to the drawings, wherein like numerals designate like components, FIG. 1 is a partial functional block diagram of video coding layer 10 set forth in the video coding standard jointly developed by the International Telecommunication Union—Telecommunications Standardization Sector's ("ITU-T") Video Coding Experts Group ("VCEG") and the International Organization for Standardization/International Electrotechnical Commission's ("ISO/IEC") Moving Picture Experts Group ("MPEG"), referred to by the ITU-T as "H.264," and by the ISO/IEC as "MPEG-4 Advanced Video Coding," which is embodied in a document entitled "Draft ITU-T Recommendation and Final Draft International Standard of Joint Video Specification (ITU-T Rec. H.264, ISO/IEC 14496-10 AVC"), Pattaya, Thailand, 7-14 Mar., 2003. Hereinafter, the video compression standard will be referred to as the "H.264/AVC Standard." The H.264/AVC Standard is hereby incorporated by reference in its entirety for all purposes, as if set forth in full herein.

An input video picture 12 is a frame or a field of a natural (uncompressed) video image defined by sample points representing components of original colors, such as chrominance ("chroma") and luminance ("luma") (other components are possible, for example, hue, saturation and value). As shown, input video picture 12 is split into macroblocks 14 that cover a rectangular picture area of 16×16 samples, which for discussion purposes are single pixels, of the luma component of the picture color. Input video picture 12 is also partitioned into macroblocks that cover 8×8 samples of each of the two chroma components of the picture color. For exemplary purposes, the luma components of I-slice type macroblocks 14 are discussed herein, unless the chroma components are specifically referenced. Although not shown in detail, it will be appreciated that the number of macroblocks 14 into which input video picture 12 is divided may depend upon a particular display resolution (for example, a picture from a video stream having a standard definition resolution of 720×480 pixels is divided into 1,350 (45×30) macroblocks).

In general operation, macroblocks 14 are temporally or spatially predicted—motion compensation/prediction, however, is not shown or discussed herein. Spatial prediction is accomplished at intra coding block 18 (discussed further below), resulting in prediction 19. A residual 20 of the prediction, which is the difference between the original and the predicted macroblock 14, is transformed, scaled and quantized at transformation/quantization block 22, using well known methods and techniques. Quantized transform coefficients 23 are entropy coded at entropy coding block 24, also using well-known methods and techniques, and transmitted (together with other information relating to the temporal or spatial prediction) as encoded video signal 26. Decoder 28 is present to conduct prediction for the next blocks and/or picture, and as such quantized transform coefficients 23 are inverse scaled/inverse transformed at transformation block 30 to produce the decoded prediction residual 32, which is added to prediction 19. The sum of decoded prediction residual 32 and prediction 19 is input to a deblocking filter 34, which outputs re-constructed video picture 36/decoded video signal 38.

In accordance with the H.264/AVC Standard, intra coding at block 18 involves predicting each pixel of a given macroblock 14 using extrapolations, or prediction modes (discussed further below), of spatially adjacent pixels (also discussed further below) of previously coded macroblocks. Using one of a predetermined number of prediction modes that is determined to be the optimum prediction mode based on a full search ("FS") algorithm, the difference between the predicted block and the actual block is then coded. The optimum prediction mode is one that minimizes prediction residual 20 (shown in FIG. 1). Coding of macroblocks may occur using 4×4 blocks of pixels or 16×16 blocks of pixels. For exemplary purposes, 4×4 blocks of pixels are discussed herein, unless specific reference is made to 16×16 blocks of pixels.

Figures 2, 3:
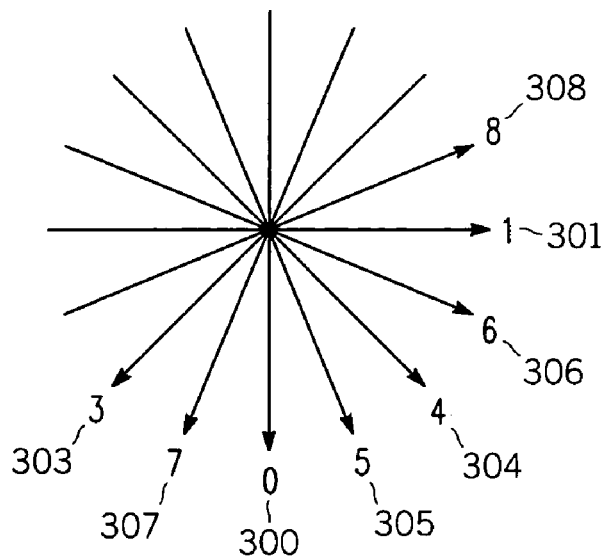
FIG. 2 illustrates a 4×4 block selected from the input video picture shown in FIG. 1.
FIG. 3 illustrates directions of the nine prediction modes, set forth in the H.264/AVC Standard, used to generate predictive pixel values within the 4×4 block shown in FIG. 2.

FIG. 2 illustrates a 4×4 block, such as a 4×4 block selected from input video picture 12 (shown in FIG. 1), of sixteen original pixels 200 labeled a through p, where $p_{ij}$, i=0,1, j=0,1 denotes the value of the pixel at the i, jth position. Pixels A, B, C, D, E, F, G, and H above, and pixels I, J, K and L to the left, have previously been encoded and reconstructed, and are assumed to be available to video coding layer 10 (shown in FIG. 1). According to the FS algorithm, each of nine prediction modes is used to calculate predictive pixel values within a 4×4 luma-component macroblock, such as block 200, according to the prediction formulae as specified in the H.264/AVC Standard.

FIG. 3 illustrates the directions of the nine prediction modes used to generate the predictive pixel values within block 200 (shown in FIG. 2). Four prediction modes are used to generate predictive pixel values within a 16×16 macroblock (not shown). In prediction mode 0 300, the vertical mode, the upper pixels A, B, C, and D are extrapolated vertically; in prediction mode 1 301, the horizontal mode, the left pixels I, J, K, and L are extrapolated horizontally; in prediction mode 2 302, the DC mode, all pixels in block 200 are predicted by the mean of pixels A.D and I.L; in prediction mode 3 303, the diagonal down-left mode, the pixels in block 200 are interpolated at a 45 degree angle between the lower-left and the upper-right; in prediction mode 4 304, the diagonal down-right mode, the pixels in block 200 are extrapolated at a 45 degree angle down and to the right; in prediction mode 5 305, the vertical-left mode, the pixels in block 200 are extrapolated at an angle of approximately 26.6 degrees to the left of vertical (width/height=½); in prediction mode 6 306, the horizontal-down mode, the pixels in block 200 are extrapolated at an angle of approximately 26.6 degrees below horizontal; in prediction mode 7 307, the vertical-right mode, the pixels in block 200 are extrapolated or interpolated at an angle of approximately 26.6 degrees to the right of vertical; and in prediction mode 8 308, the horizontal-up mode, the pixels in block 200 are interpolated at an angle of approximately 26.6 degrees above horizontal. In addition, for modes 3 through 8, the predicted pixels are formed from a weighted average of the prediction pixels A-Q.

A computation referred to by the H.264/AVC standard as the Sum of Absolute Differences ("SAD") is performed to determine the magnitude of the prediction error associated with each prediction mode. The FS algorithm results in 144 additions being performed to calculate the SAD for each block. A cost function is computed based on the SAD, specified as Cost=SAD+P*λ(Q), where P=0 for the prediction mode having the smallest SAD, and P=1 otherwise. λ(Q) is a factor based on quantization, which imparts more importance to the prediction mode having the smallest SAD, so that for a high quantization factor, the probability that the best prediction mode is chosen becomes greater. The prediction mode having the minimum cost is selected to encode prediction residual 20 (shown in FIG. 1).

Figure 4:
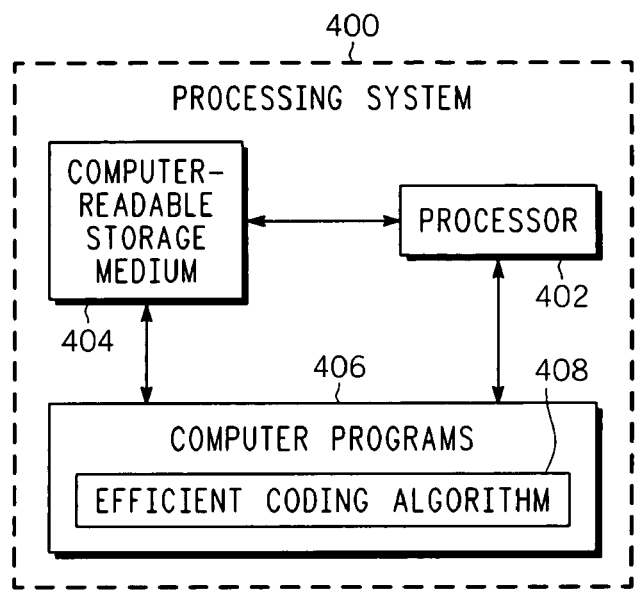
FIG. 4 is a block diagram of a processing system, illustrating certain components accessible by, or included in, functional elements of the video coding layer shown in FIG. 1, in accordance with various aspects of the present invention.

FIG. 4 is a block diagram of a processing system 400. The blocks depicted in processing system 400 are functions/components generally included in, or accessible by, elements or functions associated with video coding layer 10. As such, processing system 400 may be implemented centrally (by a personal computer, for example), or as separate systems/components (CODECs, for example) located within, or accessible by, devices that create, distribute, receive, and/or display digital video data, or any combination thereof.

A processor 402 is responsive to a computer-readable storage medium 404 and to computer programs 406. Computer-readable storage medium 404 may be any electrical, magnetic, optical, local or remote memory device or system, now known or later developed, capable of recording or storing data, and in particular may be, or may include, a read only memory ("ROM"), a flash memory, a random access memory ("RAM"), a hard disk drive, any type of compact disk or digital videodisk, and/or magnetic tape. It will be appreciated that the type of memory used may be dictated by the type data to be stored, and that computer-readable storage medium may include more than one type of memory.

Computer-readable storage medium 404 operates to store executable instructions, such as computer programs 406, which are loaded into a processor, such as processor 402, and executed.

Computer programs 406 are generally software components implemented according to well-known software engineering practices for component-based software development. Computer programs 406, however, may be any signal processing methods and/or stored instructions, in one or more parts, that electronically control or implement the functions discussed herein.

Efficient coding algorithm 408 (hereinafter referred to as MIEL method 408) represents aspects of the functional arrangement of various computer programs 406 accessible by elements/functions of video coding layer 10 (shown in FIG. 1) that pertain to the successive selection of probable best prediction modes at different stages during intra coding processing of the luma and chroma samples of I-slice-type macroblocks used in the H.264/AVC Standard in accordance with aspects of the present invention.

With continuing reference to FIGS. 1-4, FIG. 5 is a flowchart of a method for creating digital content, such as prediction residuals 20, to reconstruct a video image, such as input video picture 12, which is defined by a number of data points, such as pixels, representing a characteristic of an original color, such as luminance or chrominance, in accordance with various aspects of the present invention. The method may be implemented when one or more computer programs, such as computer programs 406 (for example, MIEL method 408 and/or functions/modules thereof associated with elements of video coding layer 10), are loaded into a processor, such as processor 402, and executed.

The method begins at block 500, and continues at block 502, where a set of data points is selected from the number of data points defining the video image, based on a color characteristic. For example, either the luma or chroma component of input video picture 12 may be selected.

The set of data points is arranged into a plurality of groups of data points, such as 4×4, 8×8, or 16×16 blocks of pixels (depending on whether the luma or chroma component has been selected), at block 504. At block 506, a first group of data points (a first 4×4 block, for example) is selected from the plurality of groups of data points.

Block size selection techniques associated with the H.264/AVC reference software, viz. JM code 8.2, are computationally complex. It is desirable to avoid the steps involved in computing the cost (discussed further below) and prediction mode (also discussed further below) associated with a block size that is ultimately not chosen for prediction. For uniform textures spatially spread over a larger area, it is desirable to choose the 16×16 block size for intra coding; for more non-uniform textures, it may be more desirable to choose the 4×4 block size. In accordance with aspects of the present invention, a metric called mode frequency may be used to capture the extent of non-uniformity over a macroblock. The definition of mode frequency is based on the rate of change of the prediction modes selected for 4×4 blocks. The mode frequency is initialized to zero at the beginning of each macroblock, and is incremented if the prediction modes of the adjacent 4×4 blocks change within the macroblock. If the modes are horizontal, vertical, or DC, the mode frequency is not incremented, as observation has shown that these modes do not result in large variations in the associated blocks. Thus, the mode frequency for a particular macroblock is computed (using the techniques and methods described herein, costs and modes for 4×4 blocks may be determined), and the mode frequency is compared with a threshold chosen by investigation. The threshold is chosen depending upon a cost versus quality tradeoff desired—theoretically, the mode frequency varies between 0 and 15. The threshold may be varied depending upon quantization factors—at high quantization factors, where there are few 16×16 macroblocks, the threshold may be lower. If the mode frequency is greater than or equal to the threshold, the selection of 4×4 blocks may automatically be made. This saves computations involved in otherwise calculating the mode and cost for 16×16 macroblocks.

Figure 5:
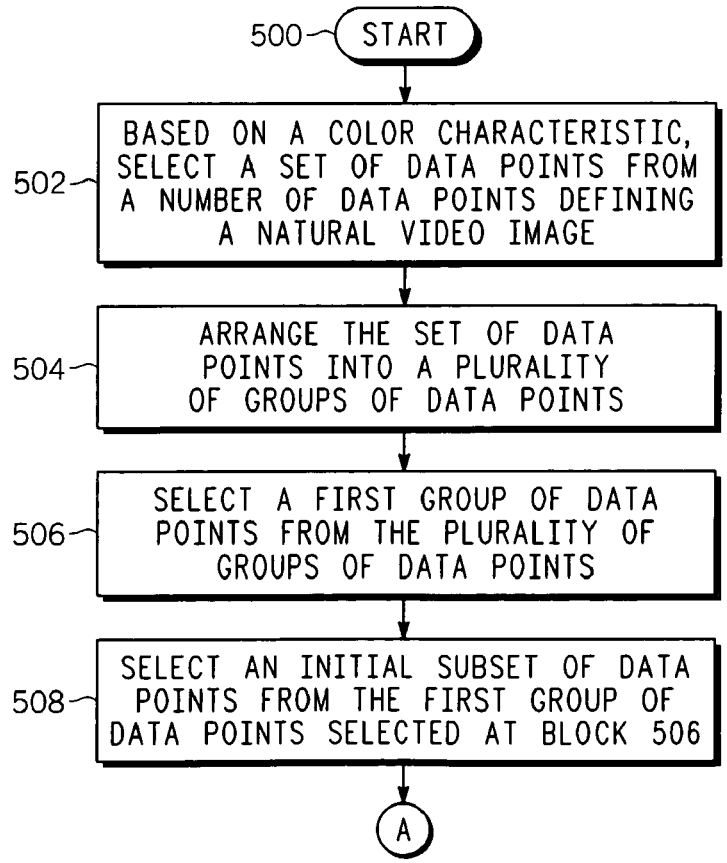
FIG. 5 is a flowchart of a method for creating digital content to reconstruct a video image in accordance with various aspects of the present invention.
Figure 5:
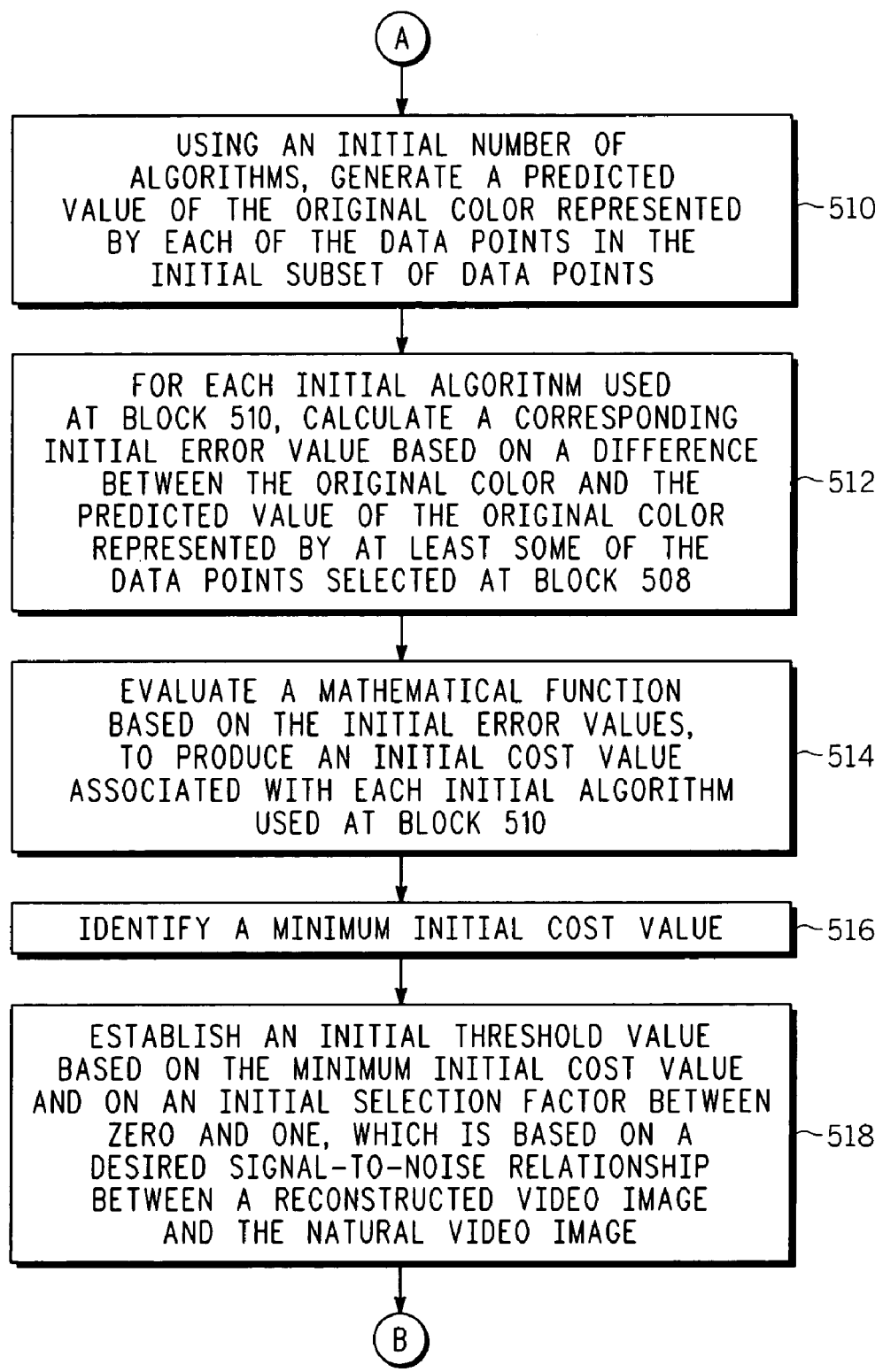
Figure 5:
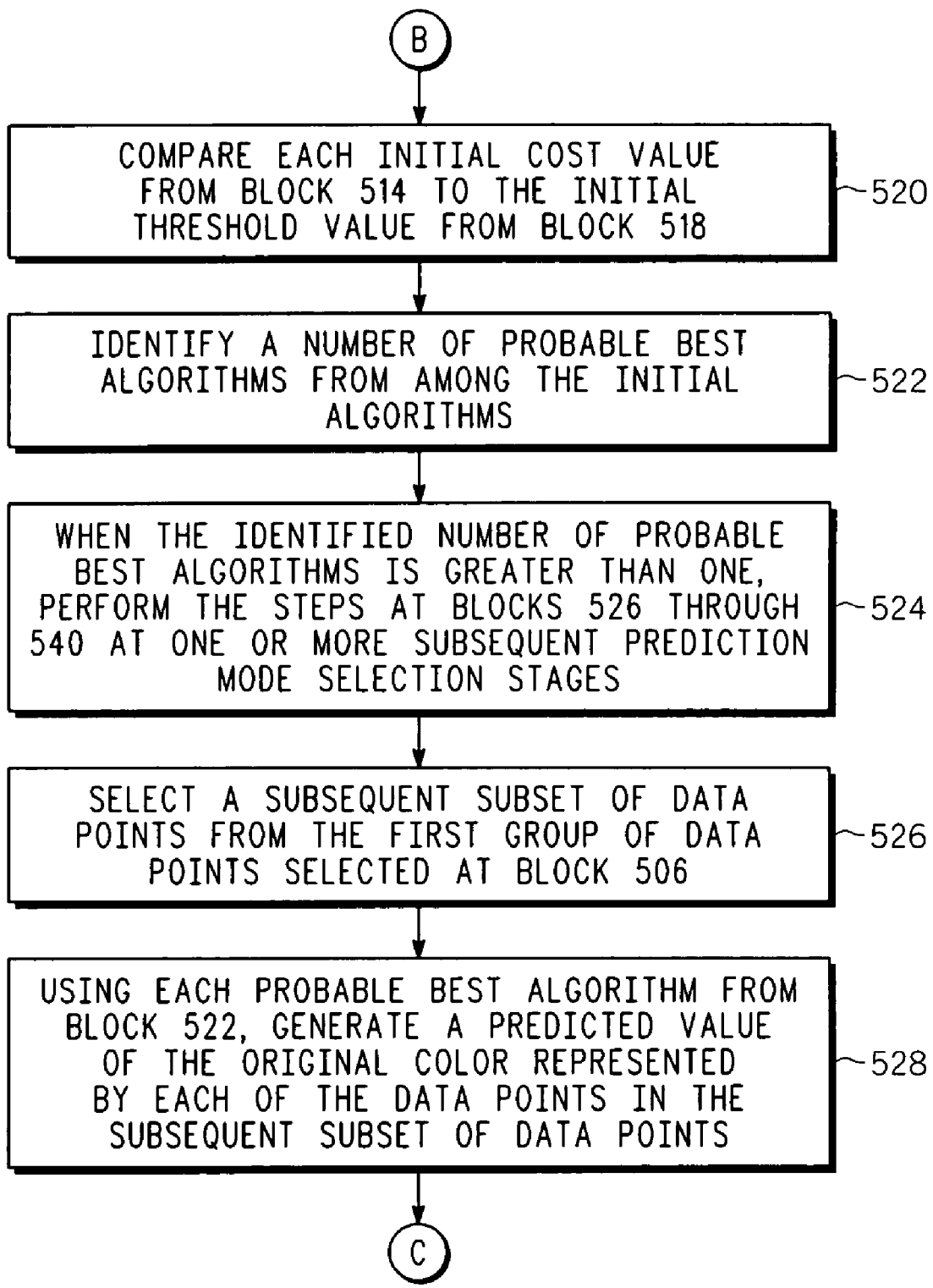
Figure 5:
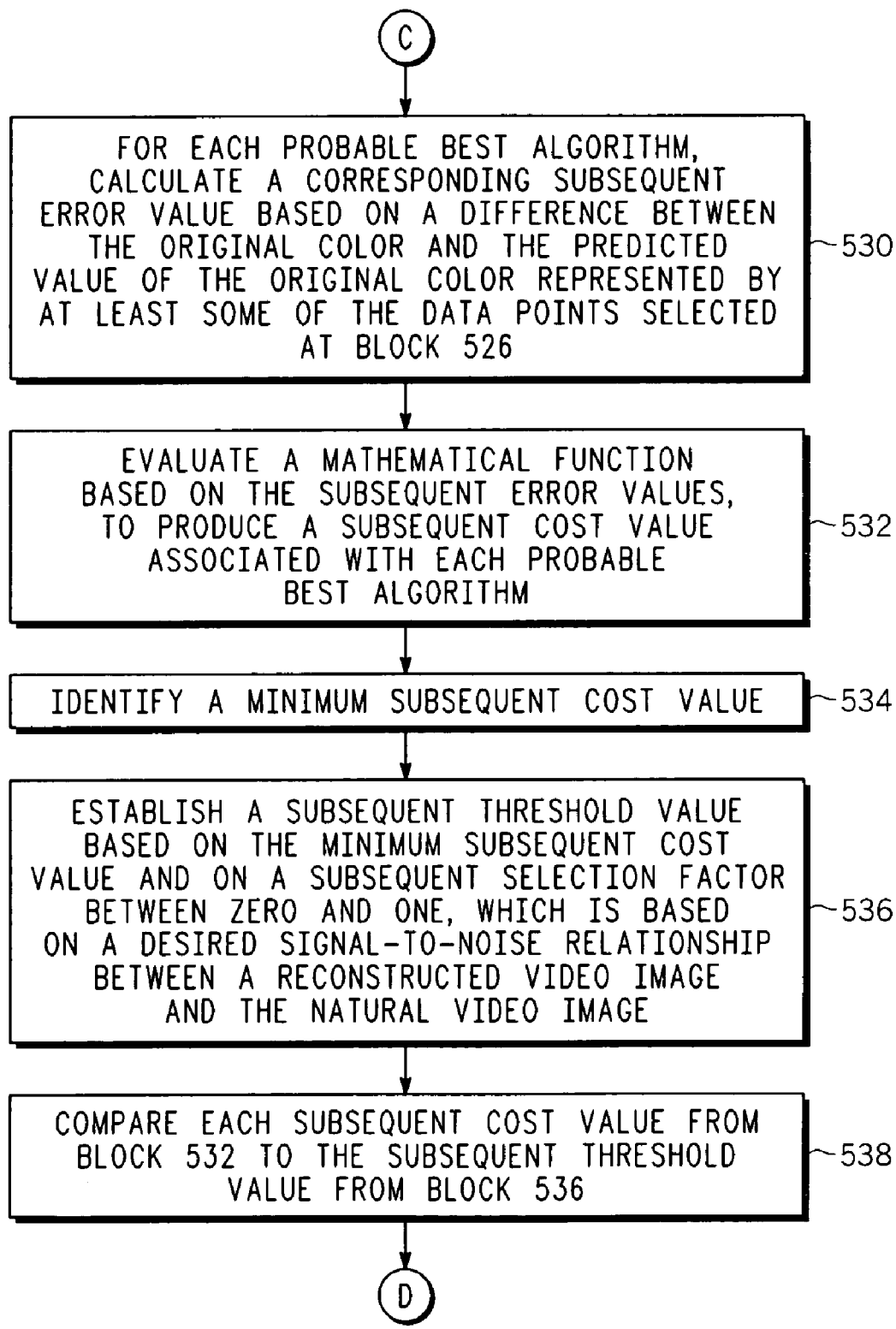
Figure 5:
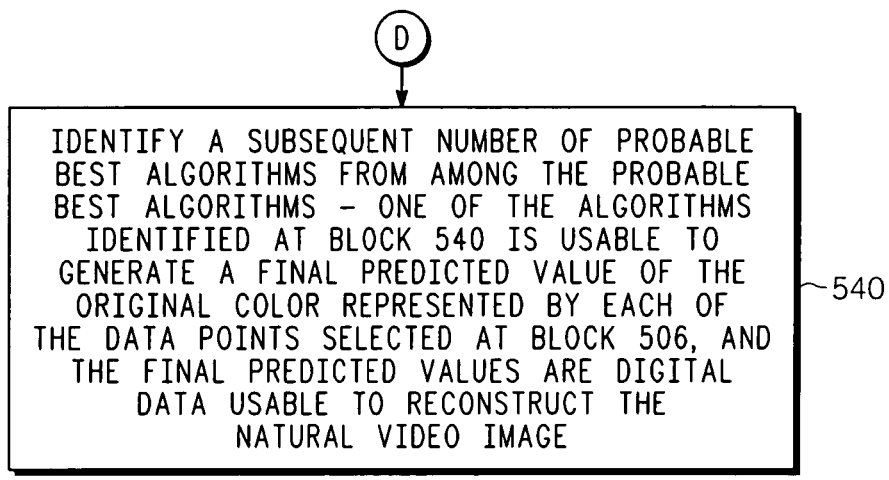
Figure 6:
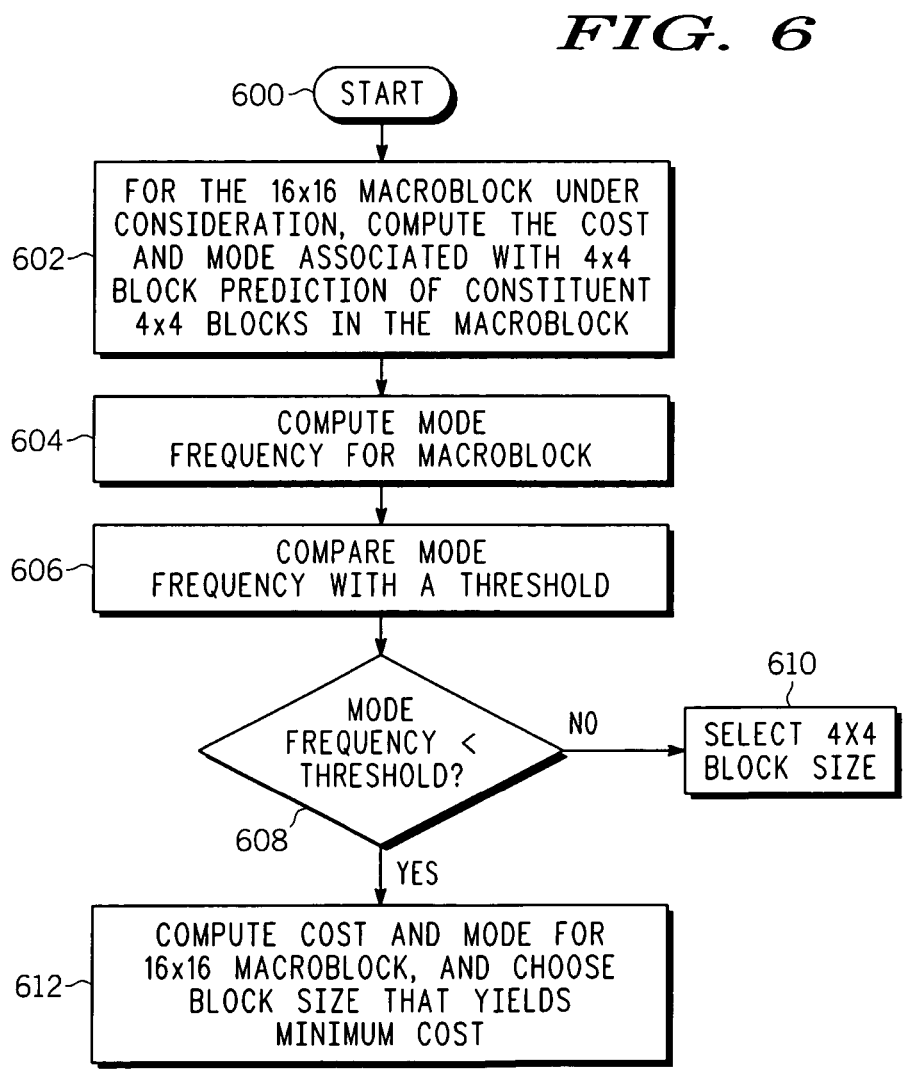
FIG. 6 is a flowchart of a block size selection method in accordance with aspects of the present invention.

FIG. 6 is a flowchart of a block size selection method, which may be implemented (at block 504 of FIG. 5, for example) in accordance with aspects of the present invention. The block size selection method begins at step 600, and continues at step 602, where, for the 16×16 macroblock under consideration, the cost and mode associated with 4×4 block prediction of the constituent 4×4 blocks in that macroblock is computed (note that the method of mode selection may be the method set forth herein, or any other method now known or later developed). At step 604, the mode frequency for that macroblock is computed, and the mode frequency is compared with a threshold, at step 606. If, at diamond 608, the mode frequency is greater than or equal to the threshold, the 4×4 block size is selected at step 610. Otherwise, at step 612, the cost and mode is computed for the macroblock, and the block size that yields the minimum cost is selected.

Referring again to FIG. 5, the steps at blocks 508 through 522 are performed at an initial prediction mode selection stage. At block 508, an initial subset of data points is selected from the first group of data points selected at block 506. In accordance with aspects of the present invention, the initial subset of four pixels within block 200—$g_1$—is represented by $g_1 = \{p_{2*i,2*j}\}$, i–0,1,j=0,1—pixels a, i, c, k). Because any image can be considered to have been generated from a stationary source, it has been found that grouping pixels based on sub-sampling is appropriate for selecting prediction modes in successive stages.

At block 510, a predicted value of the original color represented by each of the data points in the initial subset of data points is generated using an initial number of algorithms. The nine prediction modes/directions designated by the H.264/AVC Standard (shown and discussed in connection with FIG. 3) are used in the initial stage for 4×4 luma blocks. The H.264/AVC Standard provides only four prediction modes for 8×8 chroma blocks and 16×16 luma blocks. When the rate distortion ("RD") algorithm employed by JM code 8.2 is enabled ('on'), the optimization is done by preparing a subset $P_1$ of prediction modes instead of all of the prediction modes (Block 512-540). The set $P_1$ is constructed by running the algorithm for 4×4 luma prediction without RD optimization on, and finding the modes that are less than the threshold after group $g_2$ computations. The RD-optimized mode is then chosen from among these modes using direct cost computations (cost=distortion+λ*rate) for each such mode, thereby finding the one with minimum cost.

For each initial algorithm used at block 510, at block 512, a corresponding initial error value is calculated based on a difference between the original color and the predicted value of the original color represented by at least some of the data points selected at block 508, and at block 514, a mathematical function based on the initial error values is evaluated to produce an initial cost value associated with each initial algorithm. For example, for each prediction mode, $SAD_i$ is computed based on the prediction errors of the four pixels of $g_1$, and input into a mathematical function defining the cost for each prediction mode. The cost for different stages is given by:

$Cost_{4*i} = SAD_i + P*\lambda(Q) + Cost_{4*(i-1)}$ for i=1, 2, 3, 4, where i=1 is the initial stage; $Cost_{4*i} = 0$ for i=0; P=0 for the most probable selection mode (that is, the selection mode with minimum of top and left block modes); and P=1 otherwise.

A minimum initial cost value is identified at block 516, and at block 518, an initial threshold value is established based on the minimum initial cost value and on an initial selection factor. The initial selection factor may be between zero and one, and the selection factor—$S_i$—may be based on a desired signal-to-noise relationship between a reconstructed video image and the video image. In one example, $S_i$ is/are chosen in such a way that $0 < S_3 < S_2 < S_1 < 1$. The selection of $S_i$ may be based on the cost ($C_t$) vs. PSNR criteria for fixed quantization factor(s). The selection of $S_i$ may be different for different quantization factors. The criteria that may be followed in the selection of $S_i$ include significant reduction in cost, $C_t$, for small increases in computation. The threshold at stage i is given by:

$T_i = Cost_{4*i}(min) + Range_i * S_i$ for $i=1, 2, 3$ $Range_i = i * Range_1$ $Range_1 = Cost_4(max) - Cost_4(min))$ $Cost_{4*i}(min)$ is a minimum cost for the set of prediction modes $P_i$ where $P_1 = \{0, 1, 2, 3, 4, 5, 6, 7, 8\}$ for the first stage, and for subsequent stages the set $P_i$ includes prediction modes with costs less than or equal to $T_i$ for i=2,3.

At block 520, each initial cost value from block 514 is compared to the initial threshold value from block 518, and at block 522, a number of probable best algorithms are identified from among the initial algorithms. The prediction modes with costs less than $T_i$ are selected for further consideration at successive stages.

When, at block 524, the identified number of probable best algorithms is greater than one, then the steps at blocks 526 through 540 are performed at one or more subsequent prediction mode selection stages.

At block 526, a subsequent subset of data points is selected from the first group of data points selected at block 506. In accordance with aspects of the present invention, the subsequent subsets of pixels within block 200, $g_2$, $g_3$, and $g_4$ (as applicable) are represented as follows: $g_2 = \{p_{2*i+1,2*j+1}\}$ i=0, 1, j=0,1; $g_3 = \{P_{2*i,2*j+1}\}$, i=0,1, j=0,1; and $g_4 = \{p_{2*i+1, 2*j}\}$, i=0, 1, j=0, 1, where $p_{ij}$ denotes the value of the pixel at the i, jth position, and the suffixes of g indicate the stages.

At block 528, a predicted value of the original color represented by each of the data points in the subsequent subset of data points is generated using each probable best algorithm from block 522. It should be noted that the cardinality of the set prediction modes $P_i$ for i=2, 3, 4 depends on $S_i$, and $Card(P_i)$ decreases monotonically with $S_i$.

For each probable best algorithm, a corresponding subsequent error value is calculated based on a difference between the original color and the predicted value of the original color represented by at least some of the data points selected at block 526, and at block 532, a mathematical function based on the subsequent error values is evaluated to produce a subsequent cost value associated with each probable best algorithm. For example, for each prediction mode, $SAD_i$ is computed based on the prediction errors of the four pixels of $g_i$ under consideration, and input into the mathematical function—$Cost_{4*i}$—defining the cost for each prediction mode.

A minimum subsequent cost value is identified at block 534, and at block 536, a subsequent threshold value is established based on the minimum subsequent cost value and on a subsequent selection factor ($S_i$). The subsequent selection factor may be between zero and one (and may further be less than the initial selection factor), and/or be based on a desired signal-to-noise relationship between a reconstructed video image and the video image. The prediction modes with costs less than $T_i$ are selected for further consideration at successive stages. For stages subsequent to the initial stage, the number of algorithms ($P_i$) used to generate predicted values of the original colors represented by the data points in the subsequent subset of data points includes prediction modes whose cost is less than or equal to Ti for i=2,3.

At block 538, each subsequent cost value from block 532 is compared to the subsequent threshold value from block 536, and at block 540, a subsequent number of probable best algorithms are identified from among the probable best algorithms. One of these is usable to generate a final predicted value of the original color represented by each of the data points selected at block 506, and the final predicted values are digital content usable to reconstruct the video image.

Generally, the prediction mode corresponding to the minimum cost at stage 4 is selected as the best mode. The MIEL method, however, may be terminated at intermediate stages in three cases. First, MPM $cost_4$ criteria can be used, where $cost_4$ for the most probable mode is less than $x*\lambda(Q)$ where x<1, then the most probable mode is chosen as the best mode. Second, "memory criteria" may be used, where correlation of the minimum cost mode at stage 2 with the adjacent top and left minimum modes may be performed. If the mode having the minimum cost from stage 2 is the same as the mode selected from the top or left block, that mode is selected as the best mode. Third, "consistency criteria" may be used, where the minimum cost mode at stage 3 is selected as the best mode if that mode is the same as the minimum cost mode at stage 2.

For luma components having 16×16 block sizes, there are only four prediction modes. The selected best mode is the prediction mode that gives the minimum cost ($Cost_{128}$) based on pixels in $g_1$ and $g_2$. If the cost for a particular mode is less than the threshold (computed as set forth in connection with 4×4 blocks), that mode is used in stage 2. Of these, the one with the minimum cost in stage 2 is selected. In the case where RD optimization is on for 16×16 luma blocks, the optimal RD mode selection is done in the same way as it is done for 16×16 intra mode selection without RD optimization on. It may be noted that in the cost computation, the SAD may be replaced by SATD (sum of transformed differences); but this results in increased cost computation because of HADAMARD transform(s).

For chroma components, since there are only four prediction modes, slightly different selection criteria may be used. The algorithm(s) set forth herein may take as inputs both chroma components as two 8×8 blocks, and output a common prediction mode for both of the components. Each grouping contains 16 pixels (for 8×8 blocks) subsampled into sets $g_i$ in a similar fashion as 4×4 blocks. For both chroma components, only $g_1$ and $g_2$ are taken for further computations. $Cost_{16}$ is computed for each of the four prediction modes based on the 16 pixels of the subsampled groups. The cost metric involves SAD computations for each component and adding the two to get the final cost for a particular prediction mode. Two minimum modes obtained in step 2 are taken for further computation. $Cost_{32}$ is calculated for the two modes obtained in step 2, based on $g_1$ and $g_2$ of both chroma components by adding the SAD for the individual components. The prediction mode that gives the minimum $cost_{32}$ is selected as the best chroma prediction mode. After stage 1, the mode can be selected with negligible degradation in performance. With RD optimization on, for 8×8 chroma blocks, as in the case of 4×4 luma blocks, the optimal mode is chosen by examining only a reduced set $P_2$ of all four modes used for chroma prediction. The set $P_2$ is constructed by running the algorithm for chroma prediction (without RD optimization on) and finding the two modes selected after the group g1 computations. Since only two out of four modes are checked for RD optimized mode decision, considerable reduction in computation occurs with negligible change in accuracy.

When the method of the flowchart of FIG. 5, which provides for the successive selection of probable best prediction modes at different stages, is applied to intra coding the luma and chroma samples of I-slice-type macroblocks used in the H.264/AVC Standard instead of the FS algorithm, the number of SAD computations that are used to find the best prediction mode for a particular macroblock may be minimized, along with other extra processing, while keeping video quality as close to the FS algorithm as possible. The total number of computations for SAD for luma components in accordance with the MIEL method is given by:

$$C_t = (9 + \text{card}(P_2) + \text{card}(P_3) + \text{card}(P_4))*4;\ 2 < \text{card}(P_4) < \text{card}(P_3) < \text{card}(P_2) < 9,\ \text{and}\ 36 < C_t < 144.$$

When MPM cost4 criteria is used, as the quantization increases, the $\lambda$ value increases, so at high quantization this criteria results in a good amount of computation reduction and $C_t$ can be lower than 36. Use of memory criteria and consistency criteria results in a further reduction in computation, with a small reduction in PSNR.

Computations required for the chroma mode selection is 192(16*4 checks for $g_1$ and 16*2 checks for $g_2$). For 2 components it is (16*4+16*2)*2). The total computations required for the FS algorithm is 512. The MIEL method results in a savings of 62.5%.

Any extra processing that is required over the FS algorithm is minimal—for example, some extra cycles are incurred for comparisons to find the maximum. Since maximum and minimum may be found together, the average number of comparisons for the first stage of processing is 4.5. Because there are very few prediction modes considered in successive stages, the comparisons to find the minimum are fewer. In addition, since there is an order to choosing the subsampled pixels, the computations may be performed in a loop.

Table 1 presents the experimental results of a comparison between the FS algorithm and the MIEL method (the MIEL method was integrated with the JM 8.2 code released by the standards committee for the H.264/AVC Standard) for an SQCIF foreman sequence at different quantization factors with no rate control and all I frames. The parameters are as follows: Configuration: baseline; No. of Frames: 200; Input Frame Rate: 30 Fps; I Frame Period: 1; Rate control: off; RD optimization: off.

TABLE 1

| Qp | Method | $s_1, s_2, s_3$ | Bitrate (kbps) | Computations | % Bitrate. Diff | % Comp. Diff | PSNR Y | PSNR U | PSNR V | Combined PSNR |
|---|---|---|---|---|---|---|---|---|---|---|
| 5 | MIEL | 0.5, 0.3, 0.1 | 4512.48 | 63.55 | 0.128 | 55.86 | 55.87 | 56.01 | 56.13 | 55.94 |
|   | FS |  | 4506.71 | 144 |  |  | 55.87 | 56.02 | 56.12 | 55.94 |
| 20 | MIEL | 0.5, 0.3, 0.1 | 1632.85 | 59.50 | 0.39 | 58.68 | 42.46 | 44.13 | 46.15 | 43.16 |
|   | FS |  | 1626.42 | 144 |  |  | 42.46 | 44.13 | 46.14 | 43.16 |
| 31 | MIEL | 0.5, 0.3, 0.1 | 588.63 | 51.36 | 0.99 | 64.33 | 34.51 | 38.81 | 40.59 | 35.65 |
|   | FS |  | 582.77 | 144 |  |  | 34.53 | 38.80 | 40.58 | 35.66 |
| 40 | MIEL | 0.5, 0.3, 0.1 | 241.38 | 40.64 | 0.613 | 71.77 | 28.57 | 36.51 | 37.44 | 30.03 |
|   | FS |  | 239.90 | 144 |  |  | 28.61 | 36.49 | 37.43 | 30.06 |
| 48 | MIEL | 0.5, 0.3, 0.1 | 122.73 | 28.97 | 0.00 | 79.88 | 23.87 | 35.45 | 35.86 | 25.49 |
|   | FS |  | 122.72 | 144 |  |  | 23.87 | 35.46 | 35.85 | 25.49 |
| 5 | MIEL | 0.3, 0.2, 0.05 | 4517.48 | 54.10 | 0.238 | 62.4 | 55.87 | 56.01 | 56.13 | 55.94 |
| 20 | MIEL | 0.3, 0.2, 0.05 | 1635.86 | 51.18 | 0.58 | 64.45 | 42.46 | 44.13 | 46.15 | 43.16 |
| 31 | MIEL | 0.3, 0.2, 0.05 | 590.59 | 44.76 | 1.34 | 68.91 | 34.51 | 38.81 | 40.59 | 35.64 |
| 40 | MIEL | 0.3, 0.2, 0.05 | 242.24 | 35.87 | 0.975 | 75.09 | 28.57 | 36.51 | 37.44 | 30.03 |
| 48 | MIEL | 0.3, 0.2, 0.05 | 122.68 | 26.17 | 0.00 | 81.82 | 23.86 | 35.45 | 35.86 | 25.48 |
| 5 | MIEL | 0.2, 0.1, 0.02 | 4524.14 | 48.39 | 0.386 | 66.39 | 55.87 | 56.01 | 56.13 | 55.94 |
| 20 | MIEL | 0.2, 0.1, 0.02 | 1641.30 | 46.07 | 0.91 | 68.00 | 42.45 | 44.13 | 46.15 | 43.15 |
| 31 | MIEL | 0.2, 0.1, 0.02 | 592.95 | 40.77 | 1.74 | 71.68 | 34.50 | 38.81 | 40.59 | 35.64 |
| 40 | MIEL | 0.2, 0.1, 0.02 | 243.45 | 32.95 | 1.47 | 77.11 | 28.56 | 36.51 | 37.44 | 30.02 |
| 48 | MIEL | 0.2, 0.1, 0.02 | 122.81 | 24.53 | 0.00 | 82.98 | 23.85 | 35.45 | 35.86 | 25.47 |

Table 2 presents the experimental results of a comparison between the FS algorithm and the MIEL method integrated with the JM 8.2 code) for a CIF container sequence at different quantization factors with no rate control and all I frames. The parameters are as follows: Configuration: baseline; No. of Frames: 200; Input Frame Rate: 30 Fps; I Frame Period: 1; Rate control: off; RD optimization: off.

bit-rate. x=0.8 has been selected as a scaling factor for MPM $cost_4$ criteria. At high quantization values, it was observed that the MIEL method reduces computation with no change in bit-rate. This is because at high quantization values, MPM has more importance than mode selection based on prediction.

TABLE 2

| Qp | Method | s1, s2, s3 | Bitrate (kbps) | Computations | PSNR Y | PSNR U | PSNR V | Combined PSNR |
|---|---|---|---|---|---|---|---|---|
| 5 | MIEL | 0.5, 0.3, 0.1 | 16002.20 | 61.40 | 55.96 | 56.37 | 56.55 | 56.12 |
|   | FS |  | 15981.38 | 144 | 55.96 | 56.36 | 56.54 | 56.12 |
| 20 | MIEL | 0.5, 0.3, 0.1 | 5651.13 | 56.65 | 42.77 | 46.63 | 46.93 | 43.74 |
|   | FS |  | 5625.58 | 144 | 42.77 | 46.63 | 46.93 | 43.74 |
| 31 | MIEL | 0.5, 0.3, 0.1 | 2114.76 | 44.35 | 34.92 | 40.91 | 40.99 | 36.17 |
|   | FS |  | 2103.16 | 144 | 34.93 | 40.90 | 41.03 | 36.18 |
| 40 | MIEL | 0.5, 0.3, 0.1 | 804.83 | 27.85 | 29.25 | 38.03 | 37.74 | 30.73 |
|   | FS |  | 800.24 | 144 | 29.26 | 38.02 | 37.78 | 30.73 |
| 48 | MIEL | 0.5, 0.3, 0.1 | 364.12 | 17.48 | 24.57 | 36.61 | 36.03 | 26.19 |
|   | FS |  | 364.53 | 144 | 24.58 | 36.62 | 36.07 | 26.20 |
| 5 | MIEL | 0.3, 0.2, 0.05 | 16039.25 | 50.86 | 55.96 | 56.37 | 56.55 | 56.12 |
| 20 | MIEL | 0.3, 0.2, 0.05 | 5673.94 | 47.72 | 42.77 | 46.63 | 46.93 | 43.74 |
| 31 | MIEL | 0.3, 0.2, 0.05 | 2126.55 | 38.79 | 34.92 | 40.91 | 40.99 | 36.17 |
| 40 | MIEL | 0.3, 0.2, 0.05 | 810.26 | 25.07 | 29.25 | 38.03 | 37.74 | 30.72 |
| 48 | MIEL | 0.3, 0.2, 0.05 | 365.51 | 15.81 | 24.57 | 36.61 | 36.03 | 26.19 |
| 5 | MIEL | 0.2, 0.1, 0.02 | 16080.53 | 45.50 | 55.95 | 56.37 | 56.55 | 56.11 |
| 20 | MIEL | 0.2, 0.1, 0.02 | 5705.12 | 43.12 | 42.77 | 46.63 | 46.93 | 43.74 |
| 31 | MIEL | 0.2, 0.1, 0.02 | 2140.43 | 36.05 | 34.92 | 40.91 | 40.99 | 36.17 |
| 40 | MIEL | 0.2, 0.1, 0.02 | 817.12 | 23.64 | 29.25 | 38.03 | 37.74 | 30.72 |
| 48 | MIEL | 0.2, 0.1, 0.02 | 367.30 | 15.04 | 24.58 | 36.61 | 36.03 | 26.20 |

As can be seen from Tables 1 and 2, the average total number of computations shows that the MIEL method results in a good reduction in computation when compared to the FS algorithm. As the quantization value increases, the number of computations also decreases with very little change in the bit-rate. There is a very small change in bit-rate compared to the FS algorithm for the same PSNR.

Table 3 presents the experimental results of a comparison of the FS algorithm set forth in the JM code with the MIEL method for a 200 frame foreman sequence using I and P frame encoding with an intra period of 60.

TABLE 3

| Qp | Qi | Method | Bitrate | Computations | PSNR Y | PSNR U | PSNR V | Combined PSNR |
|---|---|---|---|---|---|---|---|---|
| 31 | 31 | MIEL | 92.50 | 50.62 | 33.56 | 38.41 | 39.85 | 34.75 |
|   |   | FS | 92.34 | 144 | 33.58 | 38.41 | 39.87 | 34.77 |

Table 4 presents the experimental results of a comparison of the FS algorithm set forth in the JM code with the MIEL method for mode selection for an SD sequence. The parameters are as follows: Clip: Mobile and Calendar; Code: JM8.2; Configuration: Baseline; No of Frames: 200; Input Frame Rate: 30 Fps; Frame Period: 1; Rate control: off; RD optimization: off; Selection factors: $S_1=0.25$, $S_2=0.125$, $S_3=0.0625$ for 4×4 block, $S_1=0.0625$ for 16×16 block. The results shows that there is a savings of 65% to 80% in arithmetic computation for 4×4 prediction for a very small increase in bitrate of around 1% for the same PSNR.

Table 5 presents experimental results of 16×16 mode selection. In this case, only 16×16 modes are allowed and SAD is computed instead of sum absolute transform difference (SATD). It can be seen that the MIEL method performs very close to JM in terms of quality, accompanied by a large reduction in the number of SAD computations. Scaling factors were also varied—if the scaling factor is zero, the mode with the minimum cost from the first stage is selected. Even in this case, there is very negligible degradation in performance.

TABLE 4

| Qp | Method | Bitrate (kbps) | Arithmetic Computations/ MB for 4 × 4 prediction | % Bitrate. Diff | % Comp. saving For 4 × 4 prediction | PSNR Y | PSNR U | PSNR V | Combined PSNR |
|---|---|---|---|---|---|---|---|---|---|
| 16 | MIEL | 50379.23 | 805.45 | 0.8628328 | 65 | 45.68 | 46.29 | 46.46 | 45.9 |
|  | FS | 49948.26 | 2304 |  |  | 45.68 | 46.29 | 46.46 | 45.90 |
| 19 | MIEL | 42023.58 | 803.25 | 1.0076104 | 65 | 42.88 | 43.84 | 44.05 | 43.21 |
|  | FS | 41604.37 | 2304 |  |  | 42.89 | 43.84 | 44.05 | 43.21 |
| 22 | MIEL | 34135.24 | 783.45 | 1.0637450 | 66 | 40.23 | 41.41 | 41.66 | 40.62 |
|  | FS | 33775.95 | 2304 |  |  | 40.24 | 41.41 | 41.66 | 40.63 |
| 25 | MIEL | 27776.73 | 764.18 | 1.1930011 | 67 | 37.81 | 39.27 | 39.54 | 38.28 |
|  | FS | 27449.26 | 2304 |  |  | 37.81 | 39.27 | 39.54 | 38.28 |
| 28 | MIEL | 22108.27 | 737.96 | 1.3448612 | 68 | 35.25 | 37.10 | 37.37 | 35.82 |
|  | FS | 21814.89 | 2304 |  |  | 35.26 | 37.10 | 37.37 | 35.82 |
| 32 | MIEL | 16137.53 | 685.25 | 1.6829401 | 70 | 31.87 | 35.28 | 35.49 | 32.75 |
|  | FS | 15870.44 | 2304 |  |  | 31.87 | 35.28 | 35.49 | 32.76 |
| 35 | MIEL | 12314.87 | 630.22 | 2.0022977 | 73 | 29.43 | 34.04 | 34.16 | 30.50 |
|  | FS | 12073.13 | 2304 |  |  | 29.44 | 34.04 | 34.16 | 30.51 |
| 38 | MIEL | 9166.54 | 590.40 | 2.177.705 | 74 | 27.15 | 32.88 | 32.91 | 28.37 |
|  | FS | 8971.23 | 2304 |  |  | 27.17 | 32.87 | 32.91 | 28.38 |
| 42 | MIEL | 5956.10 | 522.32 | 2.1461303 | 77 | 24.31 | 31.94 | 31.90 | 25.71 |
|  | FS | 5830.96 | 2304 |  |  | 24.32 | 31.94 | 31.91 | 25.72 |
| 46 | MIEL | 3855.62 | 453.81 | 1.5419784 | 80 | 21.92 | 31.26 | 31.17 | 23.43 |
|  | FS | 3797.07 | 2304 |  |  | 21.92 | 31.26 | 31.17 | 23.44 |

TABLE 5

| Qp | MODE | s1 | bitrate | PSNR Y | PSNR U | PSNR V | Combined PSNR | Modes after G1 |
|---|---|---|---|---|---|---|---|---|
| 5 | MIEL | .3 | 5044.35 | 55.83 | 56.01 | 56.13 | 55.91 | 1.628 |
|  | FS |  | 5042.52 | 55.83 | 56.01 | 56.13 | 55.91 |  |
| 20 | MIEL | .3 | 1979.16 | 42.43 | 44.13 | 46.14 | 43.14 | 1.629 |
|  | FS |  | 1977.90 | 42.43 | 44.13 | 46.14 | 43.14 |  |
| 31 | MIEL | .3 | 811.08 | 34.32 | 38.80 | 40.58 | 35.48 | 1.629 |
|  | FS |  | 810.44 | 34.32 | 38.30 | 40.58 | 35.48 |  |
| 40 | MIEL | .3 | 331.73 | 28.13 | 36.49 | 37.42 | 29.62 | 1.632 |
|  | FS |  | 331.53 | 28.13 | 36.49 | 37.42 | 29.62 |  |
| 48 | MIEL | .3 | 115.87 | 23.30 | 35.44 | 35.85 | 24.94 | 1.661 |
|  | FS |  | 116.19 | 23.30 | 35.44 | 35.85 | 24.94 |  |
| 5 | MIEL | .1 | 5046.45 | 55.83 | 56.01 | 56.13 | 55.91 | 1.225 |
| 20 | MIEL | .1 | 1980.40 | 42.43 | 44.13 | 46.14 | 43.14 | 1.226 |
| 31 | MIEL | .1 | 811.86 | 34.32 | 38.80 | 40.58 | 35.48 | 1.236 |
| 40 | MIEL | .1 | 332.00 | 28.13 | 36.49 | 37.42 | 29.61 | 1.239 |
| 48 | MIEL | .1 | 115.90 | 23.31 | 35.44 | 35.85 | 24.94 | 1.264 |
| 5 | MIEL | 0 | 5053.77 | 55.83 | 56.01 | 56.13 | 55.91 | 1.007 |
| 20 | MIEL | 0 | 1984.89 | 42.43 | 44.13 | 46.14 | 43.14 | 1.016 |
| 31 | MIEL | 0 | 814.69 | 34.32 | 38.80 | 40.58 | 35.48 | 1.018 |
| 40 | MIEL | 0 | 333.27 | 28.13 | 36.49 | 37.42 | 29.62 | 1.031 |
| 48 | MIEL | 0 | 116.15 | 23.31 | 35.44 | 35.85 | 24.94 | 1.066 |

Another area in which the MIEL method reduces computational complexity is in block size selection. Table 6 compares the MIEL block size selection method featuring use of the mode frequency metric with the JM code implementation of block size selection for the foreman sequence, and Table 7 makes the same comparison for the coastguard sequence. As can be seen, use of the mode frequency metric has been shown to work very well with negligible changes in bit-rates (or quality) as compared to the block size selection methods set forth in the JM code. Note that the saving in arithmetic computation cost involved in the mode selection for 16×16 macroblocks is indicated by comp_saving_metric=(total number of 16×16 blocks unchecked (i.e., absence of computation cost))/(total number of macroblocks), whereas the number of macroblocks selected is indicated by mb_selected=(total number of blocks selected for 16×16 prediction)/(total number of macroblocks).

TABLE 6

| Qp | Method | PSNR | Bitrate | mb_selected (%) | comp saving_metric (%) | 4 × 4 block sad comp/mb | 16 × 16 sad comp/mb |
|---|---|---|---|---|---|---|---|
| 5 | MIEL | 55.77 | 4738..62 | 0 | 76.54 | 936 | 327 |
|   | JM | 55.77 | 4738..62 | — | — | — | — |
| 20 | MIEL | 41.9 | 1967..74 | 0.48 | 70.35 | 920 | 331 |
|    | JM | 41.9 | 1967.45 | 1.45 | | | |
| 31 | MIEL | 33.13 | 742.44 | 13.28 | 51.16 | 857 | 332 |
|    | JM | 33.13 | 740.79 | 20.55 | | | |
| 40 | MIEL | 27.39 | 258.98 | 49.93 | 18.5 | 654 | 338 |
|    | JM | 27.39 | 258.06 | 55.11 | | | |
| 48 | MIEL | 23.26 | 92.82 | 83.72 | 3.51 | 393 | 347 |
|    | JM | 23.27 | 92.25 | 86.11 | | | |

TABLE 7

| Qp | Method | PSNR | Bitrate | mb_selected (%) | comp saving_metric (%) | 4 × 4 block sad comp/mb | 16 × 16 sad comp/mb |
|---|---|---|---|---|---|---|---|
| 5 | MIEL | 55.87 | 4516.77 | 1.09 | 81.88 | 1004 | 333 |
|   | JM |  | 4516.27 | 1.48 | — | — | — |
| 20 | MIEL | 42.46 | 1633 | 2.72 | 68.86 | 940 | 335 |
|    | JM | 42.46 | 1632.61 | 3.22 | | | |
| 31 | MIEL | 34.51 | 586.53 | 8 | 52.33 | 806 | 334 |
|    | JM | 34.51 | 586.32 | 9.16 | | | |
| 40 | MIEL | 28.57 | 242.72 | 20.38 | 32.82 | 638 | 335 |
|    | JM | 28.56 | 242.53 | 23.24 | | | |
| 48 | MIEL | 23.69 | 119.46 | 64.65 | 8.84 | 457 | 337 |
|    | JM | 23.63 | 117.68 | 68.49 | | | |

Table 8 presents the experimental results of a comparison of the FS algorithm set forth in the JM code with the MIEL method for block size selection for an SD sequence. The parameters are the same as those set forth in connection with Table 4. It can be seen that the block size selection method reduces the computation for finding mode and cost for 16×16 prediction. The result shows there is a good saving in computation when number of 16×16 blocks selected for intra prediction is less. The mode frequency threshold is chosen as 5.

TABLE 8

| Qp | Method | PSNR | Bitrate | 16 × 16 block prediction selected (%) | comp saving_metric (%) | 16 × 16 sad comp/mb |
|----|--------|------|---------|---------------------------------------|------------------------|---------------------|
| 16 | MIEL | 45.9 | 50379.23 | 3.574815 | 84.526173 | 330.389 |
|    | JM   | 45.9 | 49948.26 | 5.59778  | 0         | 1024    |
| 19 | MIEL | 43.21 | 42023.58 | 3.802469 | 83.701728 | 332.039 |
|    | JM   | 43.21 | 41604.37 | 5.714815 | 0         | 1024    |
| 22 | MIEL | 40.62 | 34135.24 | 6.279012 | 77.494074 | 334.539 |
|    | JM   | 40.63 | 33775.95 | 7.665679 | 0         | 1024    |
| 25 | MIEL | 38.28 | 27776.73 | 8.268395 | 72.649136 | 336.089 |
|    | JM   | 38.28 | 27449.26 | 9.427901 | 0         | 1024    |
| 28 | MIEL | 35.82 | 22108.27 | 11.219012 | 66.685679 | 337.396 |
|    | JM   | 35.82 | 21814.89 | 12.57.123 | 0         | 1024    |
| 32 | MIEL | 32.75 | 16137.53 | 15.591358 | 59.402222 | 338.259 |
|    | JM   | 32.76 | 15870.44 | 18.785432 | 0         | 1024    |
| 35 | MIEL | 30.50 | 12314.87 | 20.137531 | 53.352593 | 339.011 |
|    | JM   | 30.51 | 12073.13 | 24.512346 | 0         | 1024    |
| 38 | MIEL | 28.37 | 9166.84  | 26.732346 | 45.486914 | 338.624 |
|    | JM   | 28.38 | 8971.23  | 31.547160 | 0         | 1024    |
| 42 | MIEL | 25.71 | 5956.10  | 38.830864 | 32.578519 | 338.303 |
|    | JM   | 25.72 | 5830.96  | 43.887901 | 0         | 1024    |
| 46 | MIEL | 23.43 | 3855.62  | 56.121728 | 18.464444 | 338.884 |
|    | JM   | 23.44 | 3797.07  | 60.878272 | 0         | 1024    |

Yet another area in which computation reduction may be effected by the MIEL method is by properly selecting only some prediction modes for which the RD optimization costs (as set forth in the JM code) are calculated for comparisons.

Table 9 presents the experimental results of a comparison between the FS algorithm and the MIEL method (the MIEL method was integrated with the JM 8.2 code) for the first I frame of the foreman sequence, with RD optimization on. Target bit-rate: 64 kbps; $S_1=0.8$, $S_2=0.5$ for 4×4 luma; $S_1=0.3$ for 16×16 luma; 2 modes for $g_1$ in chroma.

TABLE 9

| Qp | Mode | Bitrate | Time(s) | SNR Y | SNR U | SNR V | Combined SNR |
|----|------|---------|---------|-------|-------|-------|--------------|
| 5  | MIEL | 4449.84 | .490  | 57.46 | 56.08 | 56.44 | 57.02 |
|    | FS   | 4476.48 | 1.102 | 57.98 | 56.18 | 56.55 | 57.37 |
| 20 | MIEL | 1558.56 | .361  | 42.83 | 44.13 | 46.40 | 43.47 |
|    | FS   | 1554.72 | .791  | 42.83 | 44.19 | 46.47 | 43.48 |
| 31 | MIEL | 570.72  | .261  | 34.85 | 38.67 | 40.77 | 35.94 |
|    | FS   | 563.28  | .580  | 34.89 | 38.73 | 40.70 | 35.98 |
| 40 | MIEL | 240     | .230  | 28.86 | 36.42 | 37.31 | 30.29 |
|    | FS   | 230.64  | .470  | 28.91 | 35.79 | 37.10 | 30.30 |
| 48 | MIEL | 110.64  | .210  | 24.11 | 35.17 | 35.62 | 25.71 |
|    | FS   | 104.40  | .410  | 24.03 | 35.00 | 35.25 | 25.63 |

The foregoing method also gives the flexibility to tune the cost/PSNR tradeoff. Because a low-complexity encoder may use all I frames, the reduction in computations may be very significant, and there are many lower complexity applications that could use all I frames. The cost/PSNR tradeoff may be tuned by changing $S_1$, $S_2$, and $S_3$ for allowable change in PSNR (bitrate). In experiments, $S_1$, $S_2$ and $S_3$ have been varied for different quantization values, and the reduction in computation versus increase in bit-rate has been considered. Bit-rate change is low at low quantization and high quantization values. This is because at medium quantization values, prediction may be less accurate because of quantization errors. At high quantization factors, it is more likely that MPM is chosen, so the bit-rate change is low again. Selections for $S_1$, $S_2$ and $S_3$ are suitable as follows: for low quantization values, 0.3, 0.2, and 0.1, respectively; for medium quantization values, 0.5, 0.3, and 0.2, respectively; and for high quantization values, 0.2, 0.1, and 0.02, respectively. Even lower values may be selected for high quantization values with little increase in bit-rate and large reductions in computations.

It will be appreciated that aspects of the present invention may be applied to other data processing operations, such as other video coding applications, or to other data quantization applications.

It will also be appreciated that aspects of the present invention are not limited to any specific embodiments of computer software or signal processing methods. For example, one or more processors and one or more computer programs packaged together or with other elements may implement functions described herein in a variety of ways. It will be understood, however, that the functions described herein are processes that convey or transform data in a predictable way, and may generally be implemented in hardware (e.g., application-specific integrated circuits), software, firmware, or any combination thereof.

When one element is indicated as being responsive to another element, the elements may be directly or indirectly coupled. Connections depicted herein may be logical or physical in practice to achieve a coupling or communicative interface between elements. Connections may be implemented as inter-process communications among software processes.

It will furthermore be apparent that other and further forms of the invention, and embodiments other than the specific embodiments described above, may be devised without departing from the spirit and scope of the appended claims, and it is therefore intended that the scope of this invention will only be governed by the following claims.

The invention claimed is:

1. A method for creating digital content usable to reconstruct a video image, the video image defined by a plurality of data points, each data point representing an original color, the original color having a plurality of color characteristics, the method comprising a processor performing the steps of:
   selecting a set of data points from the plurality of data points based on a color characteristic;
   arranging the set of data points into a plurality of groups of data points;
   selecting a first group of data points from the plurality of groups of data points;
   at an initial stage:
      selecting an initial subset of data points from the selected first group of data points,
         using an initial number of intra prediction algorithms, for each initial intra prediction algorithm generating a predicted value of the color represented by each of the data points in the initial subset of data points,
         for each initial intra prediction algorithm, calculating a corresponding initial error value, each calculated corresponding initial error value based on a difference between the original color and the predicted value of the original color represented by at least some of the data points in the initial subset of data points,
      for each initial intra prediction algorithm, evaluating a mathematical function based on the calculated corresponding initial error value, each evaluation producing an initial cost value associated with a particular initial intra prediction algorithm,
      identifying a minimum initial cost value,
      establishing an initial threshold value based on the minimum initial cost value and based on an initial selection factor,
         comparing each initial cost value to the initial threshold value, and based on the step of comparing, identifying a number of probable best intra prediction algorithms from among the initial intra prediction algorithms, the number of probable best intra prediction algorithms fewer than the initial number of intra prediction algorithms; and
   when the identified number of probable best intra prediction algorithms is greater than a predetermined number, at a subsequent stage:
      selecting a subsequent subset of data points from the selected first group of data points,
      using each probable best intra prediction algorithm of the number of probable best intra prediction algorithms, generating a predicted value of the original color represented by each of the data points in the subsequent subset of data points,
      for each probable best intra prediction algorithm, calculating a corresponding subsequent error value, each calculated corresponding subsequent error value based on a difference between the original color and the predicted value of the original color represented by at least some of the data points in the subsequent subset of data points,
      for each probable best intra prediction algorithm, evaluating a mathematical function based on the calculated corresponding subsequent error value, each evaluation producing a subsequent cost value associated with a particular probable best intra prediction algorithm,
      identifying a minimum subsequent cost value, establishing a subsequent threshold value based on the minimum subsequent cost value and based on a subsequent selection, and identifying a subsequent number of probable best intra prediction algorithms from among the probable best intra prediction algorithms, one of the subsequent number of probable best intra prediction algorithms usable to generate a final predicted value of the original color represented by each of the data points in the selected first group of data points, the generated final predicted values comprising digital content usable to reconstruct the video image.

2. The method according to claim 1, further comprising:
   comparing each subsequent cost value to the subsequent threshold value, and based on the step of comparing, identifying a subsequent number of probable best intra prediction algorithms.

3. The method according to claim 1, wherein the initial and subsequent selection factors are between zero and one, and based on a desired signal-to-noise relationship between a reconstructed video image and the video image.

4. The method according to claim 1, further comprising:
   when the number of probable best intra prediction algorithms is one, using the one probable best intra prediction algorithm, generating a final predicted value of the original color represented by each of the data points in the selected group of data points.

5. The method according to claim 1, further comprising:
   locating a second group of data points from the plurality of groups of data points, the located second group of data points spatially adjacent to the selected first group of data points and having a predetermined prediction intra prediction algorithm associated therewith, the predetermined prediction intra prediction algorithm being one of the initial number of intra prediction algorithms; and
      when the probable best intra prediction algorithm associated with the minimum subsequent cost value is the same as the predetermined prediction intra prediction algorithm, using the predetermined prediction intra prediction algorithm, generating a final predicted value of the original color represented by each of the data points in the selected first group of data points.

6. The method according to claim 1, wherein when the minimum initial cost value associated with a particular probable best intra prediction algorithm is less than $x*\lambda(Q)$ where $x<1$, using the associated particular probable best intra prediction algorithm, generating a final predicted value of the original color represented by each of the data points selected in the first group of data points.

7. The method according to claim 1, further comprising:
   when the subsequent number of probable best intra prediction algorithms is greater than one, repeating the steps after "at the subsequent stage".

8. The method according to claim 7, further comprising:
   when the steps after "at the subsequent stage" have been repeated, and when the identified subsequent minimum cost values are associated with the same probable best intra prediction algorithms, using the associated probable best intra prediction algorithm to generate the final predicted value of the original color represented by each of the data points in the selected first group of data points.

9. The method according to claim 8, further comprising:
   when the steps after "at the subsequent stage" have been repeated, when the subsequent number of probable best intra prediction algorithms remains greater than one, and when the identified subsequent minimum cost values are not associated with the same probable best intra prediction algorithms, again repeating the steps after "at the subsequent stage"; and when the number of probable best intra prediction algorithms is one, using the one probable best intra prediction algorithm, generating a final predicted value of the original color represented by each of the data points in the selected first group of data points.

10. The method according to claim 1, wherein the plurality of data points comprise a plurality of pixels.

11. The method according to claim 10, wherein each data point corresponds to a particular pixel.

12. The method according to claim 10, wherein the plurality of color characteristics comprise a plurality of color components.

13. The method according to claim 12, wherein each of the plurality of color components is selected from the group consisting of: chrominance, luminance, hue, saturation and value.

14. The method according to claim 13, wherein the method for creating digital content comprises an intra-prediction video processing step set forth in "Draft ITU-T Recommendation and Final Draft International Standard of Joint Video Specification (ITU-T Rec. H.264, ISO/IEC 14496-10 AVC), JVT-G050," Pattaya, Thailand, 7-14 Mar., 2003 (the "H.264 Standard").

15. The method according to claim 14, wherein the color characteristic comprises one of luminance and chrominance.

16. The method according to claim 15, wherein the plurality of groups of data points comprise one of: 4×4 blocks, 8×8 blocks, and 16×16 blocks of pixels.

17. The method according to claim 16, wherein 16×16 blocks of pixels comprise macroblocks, wherein a macroblock comprises 16 4×4 blocks of pixels.

18. The method according to claim 17, wherein the step of selecting a first group of data points from the plurality of groups of data points comprises selecting a first macroblock, and wherein the steps after "at an initial stage" and, if applicable, the steps after "at a subsequent stage" are performed for each 4×4 block of pixels within the selected macroblock.

19. The method according to claim 18, further comprising:
computing a mode frequency metric based on the rate of change of a probable best intra prediction algorithm associated with each 4×4 block of pixels within the macroblock, the mode frequency metric producing a mode frequency value representing an extent of non-uniformity of the color characteristic over the macroblock.

20. The method according to claim 19, further comprising:
comparing the mode frequency value with a threshold value, the threshold value based on a quantization factor.

21. The method according to claim 20, wherein the threshold value is based on a desired signal-to-noise relationship between a reconstructed video image and the video image.

22. The method according to claim 21, further comprising:
when the mode frequency value is greater than or equal to the threshold value, the step of arranging the set of data points into a plurality of groups of data points comprises arranging the plurality of groups of data points into 4×4 blocks of pixels.

23. The method according to claim 16, wherein each initial intra prediction algorithm is selected from one of nine luminance prediction modes set forth in the H.264 Standard.

24. The method according to claim 23, wherein when the plurality of groups of data points comprises 16×16 blocks of pixels, and when the color characteristic comprises luminance, the initial number of intra prediction algorithms comprises four intra prediction algorithms.

25. The method according to claim 23, wherein when the plurality of groups of data points comprises 4×4 blocks of pixels, and when the color characteristic comprises luminance, the initial number of intra prediction algorithms comprises nine intra prediction algorithms.

26. The method according to claim 23, wherein when the plurality of groups of data points comprise 8×8 blocks of pixels, and the color characteristic comprises chrominance, the initial number of intra prediction algorithms comprises four intra prediction algorithms.

27. The method according to claim 23, wherein the initial intra prediction algorithms are selected from among the subsequent probable best intra prediction algorithms, after performing a preliminary prediction for a 4×4 block of pixels using nine intra prediction algorithms as the initial number of intra prediction algorithms.

28. The method according to claim 27, wherein when the plurality of groups of data points comprises 4×4 blocks of pixels, when the color characteristic comprises luminance, and when a rate distortion optimization scheme as set forth in the H.264 Standard reference software is used, the initial number of intra prediction algorithms comprises fewer than nine intra prediction algorithms.

29. The method according to claim 27, wherein when the plurality of groups of data points comprises one of 8×8 blocks of pixels and 16×16 blocks of pixels, and when the color characteristic comprises one of chrominance and luminance, and when a rate distortion optimization scheme as set forth in the H.264 Standard reference software is used, the initial number of intra prediction algorithms comprises fewer than four intra prediction algorithms.

30. The method according to claim 23, wherein the initial subset of data points is represented by $p_{2*i,2*j}$, $i=0, 1, j=0,1$.

31. The method according to claim 30, wherein the union of the initial subset of data points and the subsequent subset of data points is zero.

32. The method according to claim 30, wherein the initial error value calculation corresponding to each initial intra prediction algorithm comprises the sum of absolute differences ("SAD") computation employed by the H.264 Standard reference software.

33. The method according to claim 32, wherein the mathematical function based on each calculated initial error value and calculated subsequent value comprises $cost_{4*i}=SAD_i+P*\lambda(Q)+Cost_{4*(i-1)}$ for $i=1, 2, 3, 4$, where $cost_{4*i}=0$ for $i=0$, $P=0$ for the minimum SAD, and $P=1$ otherwise.

34. The method according to claim 33, wherein the initial threshold value and the subsequent value comprise $T_i=Cost_{4*i}(minimum)+Range_i*S_i$ for $i=1, 2, 3$, $Range_i=i*Range_i$, and $Range_1=(Cost_4(maximum)-Cost_4(minimum))$, and wherein Si comprises the selection factor, $0<S_3<S_2<S_1<1$.

35. The method according to claim 34, wherein the identified number of probable best algorithms have associated initial cost values less than the initial threshold value.

36. A computer-readable medium encoded with a computer program which, when loaded into a processor, is operative to perform a method for creating digital content usable to reconstruct a video image, the video image defined by a plurality of data points, each data point representing an original color, the original color having a plurality of color characteristics, the method comprising the steps of:
selecting a set of data points from the plurality of data points based on a color characteristic;

arranging the set of data points into a plurality of groups of data points;

selecting a first group of data points from the plurality of groups of data points;

at an initial stage:

selecting an initial subset of data points from the selected first group of data points, using an initial number of intra prediction algorithms, for each initial intra prediction algorithm generating a predicted value of the original color represented by each of the data points in the initial subset of data points, for each initial intra prediction algorithm, calculating a corresponding initial error value, each calculated corresponding initial error value based on a difference between the original color and the predicted value of the original color represented by at least some of the data points in the initial subset of data points, for each initial intra prediction algorithm, evaluating a mathematical function based on the calculated corresponding initial error value, each evaluation producing an initial cost value associated with a particular initial intra prediction algorithm, identifying a minimum initial cost value, establishing an initial threshold value based on the minimum initial cost value and based on an initial selection factor, comparing each initial cost value to the initial threshold value, and based on the step of comparing, identifying a number of probable best intra prediction algorithms from among the initial intra prediction algorithms, the number of probable best intra prediction algorithms fewer than the initial number of intra prediction algorithms; and when the identified number of probable best intra prediction algorithms is greater than one, at a subsequent stage:

selecting a subsequent subset of data points from the selected first group of data points, using each probable best intra prediction algorithm of the number of probable best intra prediction algorithms, generating a predicted value of the original color represented by each of the data points in the subsequent subset of data points, for each probable best intra prediction algorithm, calculating a corresponding subsequent error value, each calculated corresponding subsequent error value based on a difference between the original color and the predicted value of the original color represented by at least some of the data points in the subsequent subset of data points, for each probable best intra prediction algorithm, evaluating a mathematical function based on the calculated corresponding subsequent error value, each evaluation producing a subsequent cost value associated with a particular probable best intra prediction algorithm, identifying a minimum subsequent cost value, establishing a subsequent threshold value based on the minimum subsequent cost value and based on a subsequent selection factor, and identifying a subsequent number of probable best intra prediction algorithms from among the probable best intra prediction algorithms, one of the subsequent number of probable best intra prediction algorithms usable to generate a final predicted value of the original color represented by each of the data points in the selected first group of data points, the generated final predicted values comprising digital content usable to reconstruct the video image.

37. An apparatus for creating digital content usable to reconstruct a video image, the video image defined by a plurality of data points, each data point representing an original color, the original color having a plurality of color characteristics, apparatus comprising:

a computer-readable storage medium; and a processor responsive to the computer-readable storage medium and to a computer program, the computer program, when loaded into the processor, operative to perform a method comprising:

selecting a set of data points from the plurality of data points based on a color characteristic;

arranging the set of data points into a plurality of groups of data points;

selecting a first group of data points from the plurality of groups of data points;

at an initial stage:

selecting an initial subset of data points from the selected first group of data points, using an initial number of intra prediction algorithms, for each initial intra prediction algorithm generating a predicted value of the original color represented by each of the data points in the initial subset of data points, for each initial intra prediction algorithm, calculating a corresponding initial error value, each calculated corresponding initial error value based on a difference between the original color and the predicted value of the original color represented by at least some of the data points in the initial subset of data points, for each initial intra prediction algorithm, evaluating a mathematical function based on the calculated corresponding initial error value, each evaluation producing an initial cost value associated with a particular initial intra prediction algorithm, identifying a minimum initial cost value, establishing an initial threshold value based on the minimum initial cost value and based on an initial selection factor, comparing each initial cost value to the initial threshold value, and based on the step of comparing, identifying a number of probable best intra prediction algorithms from among the initial intra prediction algorithms, the number of probable best intra prediction algorithms fewer than the initial number of intra prediction algorithms; and when the identified number of probable best intra prediction algorithms is greater than a predetermined number, at a subsequent stage:

selecting a subsequent subset of data points from the selected first group of data points, using each probable best intra prediction algorithm of the number of probable best intra prediction algorithms, generating a predicted value of the original color represented by each of the data points in the subsequent subset of data points, for each probable best intra prediction algorithm, calculating a corresponding subsequent error value, each calculated corresponding subsequent error value based on a difference between the original color and the predicted value of the original color represented by at least some of the data points in the subsequent subset of data points, for each probable best intra prediction algorithm, evaluating a mathematical function based on the calculated corresponding subsequent error value, each evaluation producing a subsequent cost value associated with a particular probable best intra prediction algorithm, identifying a minimum subsequent cost value, establishing a subsequent threshold value based on the minimum subsequent cost value and based on a subsequent selection factor, and identifying a subsequent number of probable best intra prediction algorithms from among the probable best intra prediction algorithms, one of the subsequent number of probable best intra prediction algorithms usable to generate a final predicted value of the original color represented by each of the data points in the selected first group of data points, the generated final predicted values comprising digital content usable to reconstruct the video image.

* * * * *